United States Patent
Baum

(10) Patent No.: US 11,912,258 B2
(45) Date of Patent: Feb. 27, 2024

(54) POWER TRANSMISSION SYSTEM HAVING DELIBERATE DRIVE TORQUE PROVISION

(71) Applicant: AUDI AG, Ingolstadt (DE)

(72) Inventor: Marcus Baum, Kelheim (DE)

(73) Assignee: AUDI AG, Ingolstadt (DE)

(*) Notice: Subject to any disclaimer, the term of this patent is extended or adjusted under 35 U.S.C. 154(b) by 399 days.

(21) Appl. No.: 17/112,078

(22) Filed: Dec. 4, 2020

(65) Prior Publication Data

US 2021/0221342 A1 Jul. 22, 2021

(30) Foreign Application Priority Data

Jan. 16, 2020 (DE) .................. 102020100954.2

(51) Int. Cl.
| | |
|---|---|
| *B60T 7/12* | (2006.01) |
| *B60T 8/1761* | (2006.01) |
| *B60W 10/04* | (2006.01) |
| *B60W 30/18* | (2012.01) |
| *B60T 8/172* | (2006.01) |

(52) U.S. Cl.
CPC ............ *B60T 8/1761* (2013.01); *B60W 10/04* (2013.01); *B60W 30/181* (2013.01); *B60T 8/172* (2013.01); *B60W 30/18109* (2013.01)

(58) Field of Classification Search
CPC ...... B60T 8/172; B60T 8/1761; B60W 10/04; B60W 30/181; B60W 30/18109
See application file for complete search history.

(56) References Cited

U.S. PATENT DOCUMENTS

| | | | | |
|---|---|---|---|---|
| 5,297,859 | A * | 3/1994 | Suzuki | B60T 8/1706 303/137 |
| 6,356,188 | B1 | 3/2002 | Meyers et al. | |
| 7,233,236 | B2 * | 6/2007 | Lu | B60T 8/00 180/197 |
| 7,389,170 | B2 * | 6/2008 | Nakao | B60T 8/172 701/79 |
| 7,801,657 | B2 * | 9/2010 | Piyabongkarn | B60K 17/34 475/43 |

(Continued)

FOREIGN PATENT DOCUMENTS

| | | |
|---|---|---|
| CN | 103987595 A | 8/2014 |
| DE | 3830143 A1 | 3/1989 |

(Continued)

OTHER PUBLICATIONS

German Examination Report dated Nov. 4, 2020 in corresponding German Application No. 102020100954.2; 12 pages; Machine translation attached.

(Continued)

*Primary Examiner* — Gonzalo Laguarda
(74) *Attorney, Agent, or Firm* — Maier & Maier, PLLC

(57) ABSTRACT

A transmission system for a vehicle including a drive, at least one wheel and at least one brake having an ABS system. The drive is configured to drive the at least one wheel and the at least one brake is configured to brake the at least one wheel. The power transmission system is configured to also drive the at least one wheel braked by the at least one brake during a braking process, which enters a control range of the ABS system, at the same time using a drive torque.

14 Claims, 1 Drawing Sheet

(56) References Cited

U.S. PATENT DOCUMENTS

| | | | |
|---|---|---|---|
| 8,870,299 B2* | 10/2014 | Wieder | B60T 8/90 303/113.1 |
| 9,174,534 B2* | 11/2015 | Gao | B60K 28/16 |
| 2015/0039166 A1* | 2/2015 | Bergmann | B60T 8/321 701/22 |
| 2018/0222459 A1 | 8/2018 | Kelly et al. | |

FOREIGN PATENT DOCUMENTS

| | | |
|---|---|---|
| DE | 102012222490 A1 | 6/2013 |
| DE | 102012002690 A1 | 8/2013 |
| DE | 102013002890 A1 | 8/2014 |
| DE | 102018100148 A1 | 7/2018 |
| WO | 2013/041311 A1 | 3/2013 |

OTHER PUBLICATIONS

Office Action dated Dec. 20, 2023, in corresponding Chinese Application No. 202011502138.3, 12 pages.

* cited by examiner

POWER TRANSMISSION SYSTEM HAVING DELIBERATE DRIVE TORQUE PROVISION

FIELD

The present invention relates to a power transmission system for a vehicle comprising a drive, at least one wheel, and at least one brake having an anti-lock braking system (ABS), wherein the drive is configured to drive the at least one wheel and the at least one brake is configured to decelerate the at least one wheel.

BACKGROUND

A power transmission from a wheel or tire of a vehicle to a roadway is dependent on its slip during movement. A zero slip here denotes the state in which the rotational velocity of a tread of the tire is equal to a vehicle velocity. This is the case, for example, when the tire rolls straight ahead at a constant velocity.

A maximum slip is achieved when a wheel is locked, in particular when there is no rotation, with simultaneous translational movement of the vehicle, for example when the tire locks during braking.

Current vehicles are typically equipped with an ABS. The ABS system is based on a measurement of the rotational velocity of the tire or the wheel. If, for example, there is an unexpectedly sharp decrease of the rotational velocity of an individual tire, for example if the tire threatens to lock, and a sharp increase of the slip, the brake on this tire is thus released by the ABS system.

Permanent locking of the tire thus does not occur. The vehicle also remains maneuverable due to the improved power transmission from the tire to the road.

Modern drive concepts, for example hybrid, electric, or electrified vehicles, enable extremely fast provision of a drive torque.

A control of the deceleration of a motor vehicle is known from document US 2018 222 459 A1. The control includes comparing a velocity value of the motor vehicle to a braking force value of a braking system, wherein a drive torque is provided based on the comparison of at least one wheel of the motor vehicle during a braking process.

Even currently, in the event of heavy braking, temporary locking of one or more tires or exceeding the range of optimum power transmission can occur depending on a braking force and roadway conditions. In order to leave the range of excessive slip with nonoptimal power transmission, the tire has to gain rotational velocity.

For this purpose, a non-negligible energy input is required due to the typically high moment of inertia of the wheel. This energy input takes place, especially after the ABS has opened the brake, due to the friction of the tire on the roadway moving at a higher velocity in relation to the tread or, if necessary, from the drive train or the differential.

The component of the friction is possibly low depending on roadway conditions, for example if it is wet. The available drive torque is thus random to a certain extent.

SUMMARY

The object of the present invention is to provide a system which enables improvement of a deceleration and a stability of a motor vehicle.

This object is achieved by a power transmission system and by a method for maximizing a power transmission.

The subject matter of the present invention is a power transmission system for a vehicle comprising a drive, at least one wheel, and at least one brake having an anti-lock braking system (ABS), wherein the drive is configured to drive the at least one wheel and the at least one brake is configured to decelerate the at least one wheel.

According to the invention, the power transmission system is configured to also drive the at least one wheel braked by the at least one brake during a braking process, which enters a control range of the ABS system, at the same time using a drive torque. The braking process of the wheel is reduced in order to release the braking.

The power transmission system is configured to apply a drive torque to the wheel at the same time as the reduction of the braking process or the release of the brake. This has the advantage that the drive torque sets the wheel rolling again at the same time.

In addition, it has the advantage that the time period during which the wheel is unbraked is shortened. Furthermore, the transmission of lateral guidance forces of the wheel is improved in this way. This improves both the deceleration when braking and also the overall vehicle stability.

In an optional design, the power transmission system is configured to apply a torque to the wheel even during the braking process in the event of a foreseeable locking of the wheel. This offers the advantage that the wheel does not lock or an unfavorable slip range is left as soon as the brake is released with the aid of the ABS. In this way, a drive torque or torque can be provided deliberately to the potentially locking wheel in the event of a strong braking process. The slip is reduced and an active maximization or increase of the force transmitted by the wheel to the road surface is achieved.

In a further optional design, the power transmission system is configured to release the brake of the wheel with the aid of the ABS and to provide a torque at the wheel in the event of locking of the wheel. Thus, in the event of a strong braking process after an ABS intervention, a drive torque can be provided deliberately to the released wheel in order to drive the stationary wheel again. The slip is reduced and an active maximization or increase of the force transmitted by the wheel to the roadway is achieved.

In one refinement, the power transmission system is configured to overcompensate for the drive torque during the braking process. Overcompensating here means that an additional torque is applied to the wheel during a braking process, in particular before locking occurs, wherein the braking force on the wheel is not exceeded. This has the advantage that uncontrolled acceleration does not occur. In order to achieve this, the power transmission system is usually configured to provide a torque even before the brake is released. This has the advantage that the torque is available immediately when the brake is released in order to drive the wheel again. The power transmission system is thus configured to overcome the increasing slip due to the braking process by way of the drive torque or to superimpose the drive torque thereon in order to achieve a reduction of the slip to an optimum slip. This offers the advantage that the power transmission system is configured to set an optimum power transmission from the wheel to the roadway as quickly as possible.

In one design, the power transmission system comprises an acquisition unit which is configured to acquire a power transmission or a slip of the at least one wheel on a roadway. This offers the advantage that the power transmission system is configured to continuously monitor the power transmission or the slip of the at least one wheel on the roadway.

In a further design, the power transmission system comprises an ascertainment unit which is configured to ascertain a need to provide a drive torque. This offers the advantage that the power transmission system is configured to establish, based on the monitored power transmission of the at least one wheel to the roadway, a need to provide the drive torque.

The power transmission system is configured to establish, in the event of a slip of the wheel acquired by the acquisition unit which enters the control range of the ABS, a need to provide the drive torque.

In a refinement, the power transmission system comprises at least one additional sensor which is configured to acquire at least one further measured value, wherein the power transmission system comprises a determination unit, which is configured to compare a speed of the at least one wheel in consideration of the at least one further measured value. An additional measured value or measured values can be a speed of at least one further wheel, data from a satellite-based position determination, for example GPS, camera data, LIDAR data, radar data, or data from an acceleration sensor system. As a rule, the power transmission system is configured to acquire a velocity or a velocity vector of the vehicle using at least one additional sensor.

In a further refinement, the determination unit is configured to carry out the respective comparison of the speed of the at least one wheel in conjunction with modeling of an optimum speed of the wheel determined from the currently expected slip. With the aid of modeling, an existing input variable of a wheel speed and an existing measured variable of the vehicle can be brought together in order to determine the optimum speed provided for the respective wheel. The modeling optionally comprises data from other sensors. In an alternative design, the determination unit is configured to ascertain a suitable speed of the wheel using modeling without additional sensors.

The subject matter of the present invention is moreover a method for maximizing a power transmission from a wheel to a roadway using an above-described power transmission system.

In the method according to the invention, a speed of the at least one wheel is determined in a first step a. In general, the power transmission system comprises at least one sensor which is configured to acquire a speed. In general, a slip of the at least one wheel is determined at the same time.

The power transmission system generally has an acquisition unit which acquires the power transmission or the slip of the at least one wheel on the roadway. This ensures continuous monitoring of the power transmission or the slip of the at least one wheel on the roadway.

In a further step b, a deviation of the present speed from an optimal speed for the respective situation is determined from the determined speed. Alternatively, a deviation of the present slip from an optimal slip for the respective situation is determined. For this purpose, the power transmission system has a determination unit which compares the speed of the at least one wheel and/or a slip of the wheel.

In general, the power transmission system comprises at least one additional sensor, wherein the sensor acquires at least one further measured value, for example the vehicle velocity. The determination unit can generally compare the speed of the at least one wheel in consideration of the at least one further measured value, for example the vehicle velocity. The comparison of a respective speed of the respective wheel can alternatively be carried out in conjunction with modeling of an optimal speed determined from the currently expected slip.

In a further step c, a torque is applied to the wheel in order to adapt the speed or to get out of the non-optimal slip. In one embodiment, the wheel is locked, for example, and has to have a torque applied or has to be accelerated.

In an alternative embodiment, a torque is generally applied to the wheel in the event of heavy braking, so that the wheel is automatically accelerated as needed by releasing the brake.

According to the invention, in a first step, any occurring slip of the at least one wheel on a roadway is acquired by an acquisition unit. This ensures continuous monitoring of the power transmission or the slip of the at least one wheel on the roadway.

In a further step, a speed of the at least one wheel is determined by a determination unit. In an alternative design, the speed of the at least one wheel is optionally compared by the determination unit, taking into consideration at least one further measured value.

In a further step, a need to apply a drive torque to the at least one wheel in order to maximize a power transmission from the at least one wheel to the roadway is ascertained by an ascertainment unit. The power transmission system thus monitors the power transmission from the at least one wheel to the roadway.

The power transmission system is configured to establish, in the event of a slip of the wheel acquired by the acquisition unit which enters the control range of the ABS, a need to provide the drive torque. The power transmission system thus also monitors the need to provide the drive torque.

In a further step, the drive torque is provided to increase the speed of the wheel until an improved power transmission of the wheel is achieved by reducing the slip. In general, the power transmission system overcompensates the drive torque during a braking process.

In a refinement, the comparison of the speed of the at least one wheel is carried out in conjunction with additional sensors, wherein it is ascertained from a current velocity and the speed of the wheel whether the respective wheel has the currently optimal speed. The additional sensors acquire further measured values, wherein the determination unit of the power transmission system compares a speed of the at least one wheel in consideration of the at least one further measured value.

In a further refinement, the respective comparison of the wheel speeds of the respective wheel is carried out in conjunction with modeling of an optimal speed of the wheel determined from the currently expected slip.

In one design, a torque is applied to a locked wheel during an ABS intervention or an active ABS system.

BRIEF DESCRIPTION OF THE FIGURES

The invention is schematically illustrated in the drawings with the aid of embodiments and is described further with reference to the drawings, wherein the same components are identified by the same reference numerals. In the figures.

DETAILED DESCRIPTION

Figure 1:
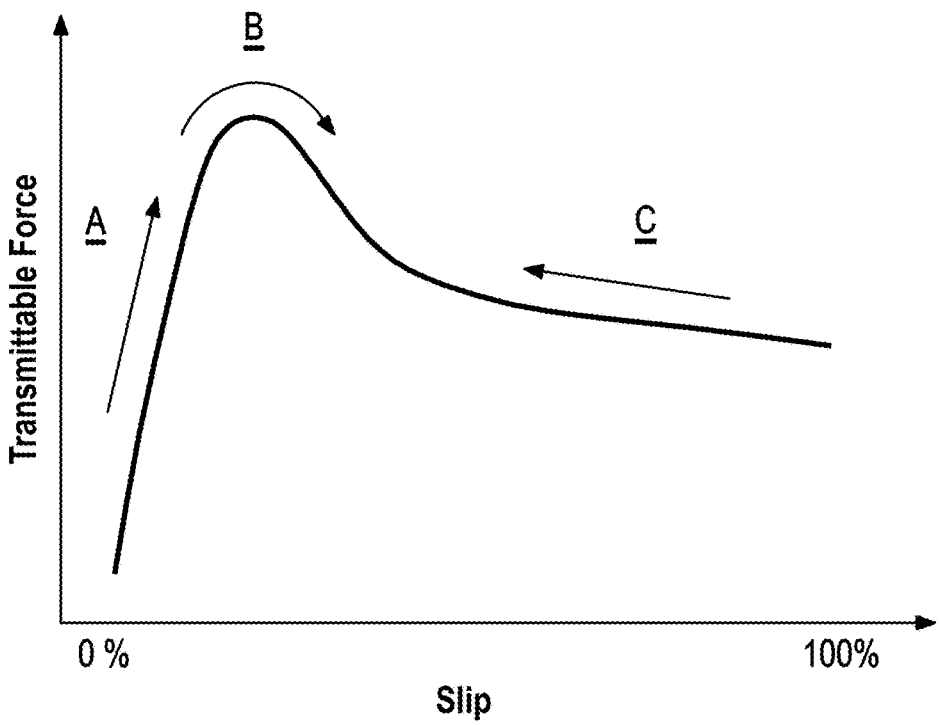
FIG. 1 shows a typical power transmission from a wheel to the roadway.

FIG. 1 shows a typical power transmission from a tire or wheel to a roadway. A line diagram of the power transmission is shown. The transmitted power is shown on the Y-axis and the slip is shown in percent on the X-axis.

A curve profile of the transmittable power or the power transmission as a function of the slip is shown. The curve profile has three subsections A, B, C. During the first subsection there is an increase in the transmittable power with a slight increase in the slip.

In the event of heavy braking, depending on the braking force and roadway conditions, one or more wheels can temporarily lock or the range of optimal power transmission can be exceeded. In FIG. 1, the subsection B shows the exceeding of the optimal power transmission.

In order to leave the range of excessive slip with nonoptimal power transmission, the tire or the wheel has to gain rotational velocity. For this purpose, a high energy input is required due to the typically high moment of inertia of the wheel.

This energy input usually takes place, after the ABS system has opened the brake, due to the friction of the tire on the roadway moving at a higher velocity in relation to the tread or from a drive train or a differential. The component of the friction is low depending on roadway conditions, for example when wet. The available drive torque is thus random to a certain extent.

Subsection C shows how a drive torque can be deliberately provided. Modern drive concepts, for example hybrid, electric, or electrified vehicles, enable extremely fast provision of a drive torque. In this way, in the event of a heavy braking process, a drive torque can be provided deliberately at the locked or potentially locking wheels, whereby the slip is reduced and an active maximization or increase of the power transmitted by the tire is achieved.

Figure 2:
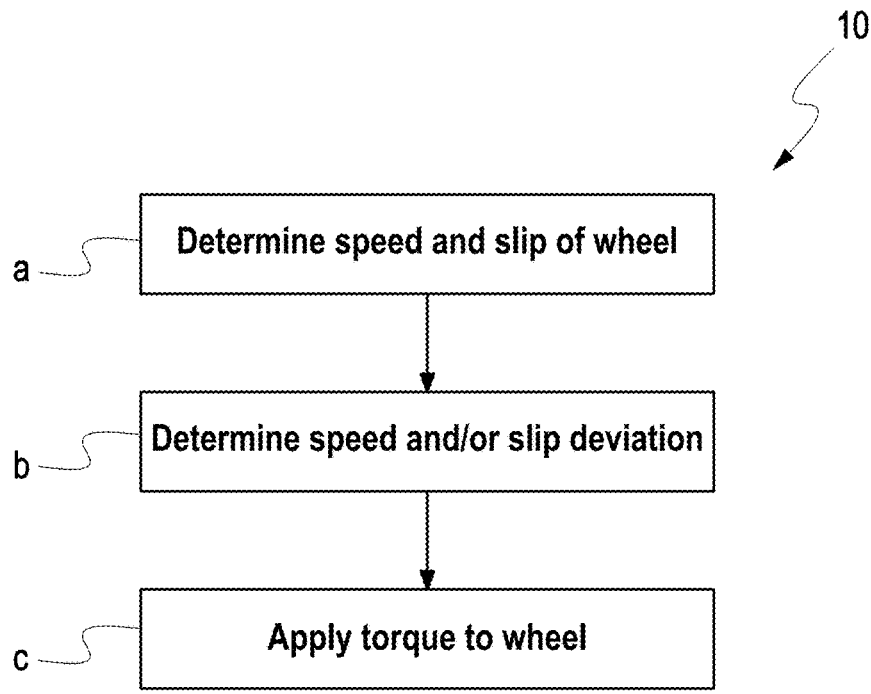
FIG. 2 shows a schematic sequence of one embodiment of the method according to the invention for maximizing a power transmission from a wheel to a roadway using one embodiment of a power transmission system according to the invention.

FIG. 2 shows a schematic sequence of one embodiment of the method according to the invention for maximizing a power transmission from a wheel to a roadway using one embodiment of the power transmission system 10 according to the invention.

In the method according to the invention, a speed of the at least one wheel is determined in a first step a. In general, the power transmission system comprises at least one sensor which is configured to acquire a speed. In general, a slip of the at least one wheel is determined at the same time.

In a further step b, a deviation of the present speed from an optimal speed for the respective situation is determined from the determined speed. Alternatively, a deviation of the present slip from an optimal slip for the respective situation is determined. For this purpose, the power transmission system generally has a determination unit which is configured to compare a speed and/or a slip of the at least one wheel.

In general, the power transmission system comprises at least one additional sensor, wherein the sensor acquires at least one further measured value, for example the vehicle velocity. The determination unit can generally compare the speed of the at least one wheel in consideration of the at least one further measured value, for example the vehicle velocity. The comparison of a respective speed of the respective wheel can alternatively be carried out in conjunction with modeling of an optimal speed determined from the currently expected slip.

In a further step c, a torque is applied to the wheel in order to adapt the speed or to get out of the non-optimal slip. In one embodiment, the wheel is locked, for example, and has to have a torque applied or has to be accelerated. In an alternative embodiment, a torque is generally applied to the wheel in the event of heavy braking, so that the wheel is automatically acted upon or accelerated as needed by releasing the brake.

Overall, a torque is thus applied by the power transmission system to a locked wheel during an ABS intervention or an active ABS system. Optionally, the power introduced as torque causes an acceleration. An acceleration is, in this case, a rotation of the wheel resulting from the application of a torque to the wheel. Therefore, in the event of a strong braking process, a drive torque is provided deliberately in the locked or potentially locking wheels, whereby the slip is reduced and an active maximization or increase of the power transmittable by the tire is achieved.

LIST OF REFERENCE NUMERALS

A first subsection
B further subsection
C further subsection
a first step
b further step
c further step
d further step

The invention claimed is:

1. A power transmission system for a vehicle comprising a drive, at least one wheel, and at least one brake having an anti-lock braking system,
   wherein the drive is configured to drive the at least one wheel, and the at least one brake is configured to brake the at least one wheel,
   wherein the power transmission system is configured to drive the at least one wheel braked by the at least one brake with a drive torque applied during a braking process within a control range of the anti-lock braking system,
   wherein the power transmission system is further configured to compare a measured speed of the at least one wheel braked by the at least one brake with at least one further measured value obtained by at least one additional sensor to establish a slip of the at least one wheel, and
   wherein the at least one additional sensor comprises a camera.

2. The power transmission system as claimed in claim 1, wherein the power transmission system is configured to overcompensate for the drive torque during the braking process.

3. The power transmission system as claimed in claim 1, wherein the power transmission system comprises an ascertainment unit which is configured to ascertain a need to provide the drive torque.

4. The power transmission system as claimed in claim 1, wherein is the power transmission system is further configured to model an optimum speed of the at least one wheel braked by the at least one brake based on a currently expected slip and the comparison between the measured speed and the at least one further measured value.

5. The power transmission system as claimed in claim 1, wherein the at least one further measured value comprises a wheel speed of a wheel different from that of the at least one wheel braked by the at least one brake.

6. The power transmission system as claimed in claim 1, wherein the at least one additional sensor further comprises a GPS sensor.

7. The power transmission system as claimed in claim 1, wherein the at least one additional sensor further comprises a LIDAR sensor.

8. The power transmission system as claimed in claim 1, wherein the at least one additional sensor further comprises an accelerometer.

9. The power transmission system as claimed in claim 1, wherein the at least one further measured value comprises a velocity of the vehicle.

10. The power transmission system as claimed in claim 1, wherein the at least one further measured value comprises a velocity vector of the vehicle.

11. A method for maximizing a power transmission from a wheel to a roadway, comprising:
  measuring a speed of at least one wheel braked by at least one brake within a control range of an anti-lock braking system;
  comparing the speed of the at least one wheel with at least one further measured value obtained by at least one additional sensor to establish a slip of the at least one wheel,
  applying a drive torque to the at least one wheel while the at least one wheel is braked by the at least one brake to bias the at least one wheel towards an optimal slip,
  wherein the at least one additional sensor comprises a camera.

12. The method as claimed in claim 11, further comprising modeling an optimum speed of the at least one wheel braked by the at least one brake based on a currently expected slip and the comparison between the measured speed and the at least one further measured value.

13. The method as claimed in claim 11, wherein the drive torque is applied while the anti-lock braking system is active.

14. A power transmission system for a vehicle comprising a drive, at least one wheel, and at least one brake having an anti-lock braking system,
  wherein the drive is configured to drive the at least one wheel, and the at least one brake is configured to brake the at least one wheel,
  wherein the power transmission system is configured to drive the at least one wheel braked by the at least one brake with a drive torque applied during a braking process within a control range of the anti-lock braking system,
  wherein the power transmission system is further configured to compare a measured speed of the at least one wheel braked by the at least one brake with at least one further measured value obtained by at least one additional sensor to establish a slip of the at least one wheel, and
  wherein the at least one additional sensor comprises a LIDAR sensor.

\* \* \* \* \*